(12) United States Patent
Shiraki et al.

(10) Patent No.: US 8,178,049 B2
(45) Date of Patent: May 15, 2012

(54) CARBON NANOTUBE OR CARBON NANOFIBER PRODUCTION APPARATUS AND RECOVERY APPARATUS

(75) Inventors: Shuichi Shiraki, Tokyo (JP); Takeji Murai, Makinohara (JP); Yuzou Nakagawa, Tokyo (JP)

(73) Assignee: Nikkiso Co., Ltd., Tokyo (JP)

( * ) Notice: Subject to any disclaimer, the term of this patent is extended or adjusted under 35 U.S.C. 154(b) by 80 days.

(21) Appl. No.: 12/680,545

(22) PCT Filed: Oct. 16, 2008

(86) PCT No.: PCT/JP2008/068786
§ 371 (c)(1),
(2), (4) Date: Mar. 26, 2010

(87) PCT Pub. No.: WO2009/081645
PCT Pub. Date: Jul. 2, 2009

(65) Prior Publication Data
US 2010/0254860 A1    Oct. 7, 2010

(30) Foreign Application Priority Data

Dec. 26, 2007  (JP) .................................. 2007-334650

(51) Int. Cl.
*C01B 31/02*  (2006.01)
*D01F 9/12*   (2006.01)

(52) U.S. Cl. ........................................................ 422/129
(58) Field of Classification Search .................. 422/129
See application file for complete search history.

(56) References Cited

U.S. PATENT DOCUMENTS

| | | | | |
|---|---|---|---|---|
| 2,917,374 | A | * | 12/1959 | Wood ................................ 23/314 |
| 4,368,182 | A | * | 1/1983 | Mills et al. ..................... 423/450 |
| 4,404,178 | A | * | 9/1983 | Johnson et al. ............... 423/450 |
| 7,368,087 | B2 | | 5/2008 | Merino Sanchez et al. |
| 2003/0041732 | A1 | * | 3/2003 | Alford et al. .................... 95/280 |
| 2004/0005269 | A1 | | 1/2004 | Huang et al. |
| 2008/0102019 | A1 | | 5/2008 | Jeong et al. |

FOREIGN PATENT DOCUMENTS

| | | |
|---|---|---|
| EP | 1 277 858 B1 | 11/2006 |
| JP | 2004149961 A | 5/2004 |
| JP | 2004339041 A | 12/2004 |
| JP | 2006008506 A | 1/2006 |
| JP | 2006169002 A | 6/2006 |
| JP | 2006315889 A | 11/2006 |
| JP | 2007261937 A | 10/2007 |

OTHER PUBLICATIONS

International Search Report and Written Opinion in International Application No. PCT/JP2008/068786 mailed Dec. 2, 2008.
Chinese Office Action, Nov. 28, 2011 for International Application No. 200880110613.3, Applicant: Nikkiso Co., Ltd, Title: Carbon nanotube or carbon nanofiber production apparatus and recovery apparatus with translation.

* cited by examiner

*Primary Examiner* — Walter D Griffin
*Assistant Examiner* — Huy-Tram Nguyen
(74) *Attorney, Agent, or Firm* — McCarter & English, LLP

(57) ABSTRACT

A discharge gas containing carbon nanotubes and discharged from a reactor unit (12) is led to a filter (26) through a discharge pipe (24). A blower (28) is disposed downstream from the filter (26). The blower (28) is used to such the discharged gas in the discharge pipe (24). Thus, even when the filter has begun to clog, the pressure inside the discharge pipe on the side upstream from the filter is prevented from increasing.

4 Claims, 1 Drawing Sheet

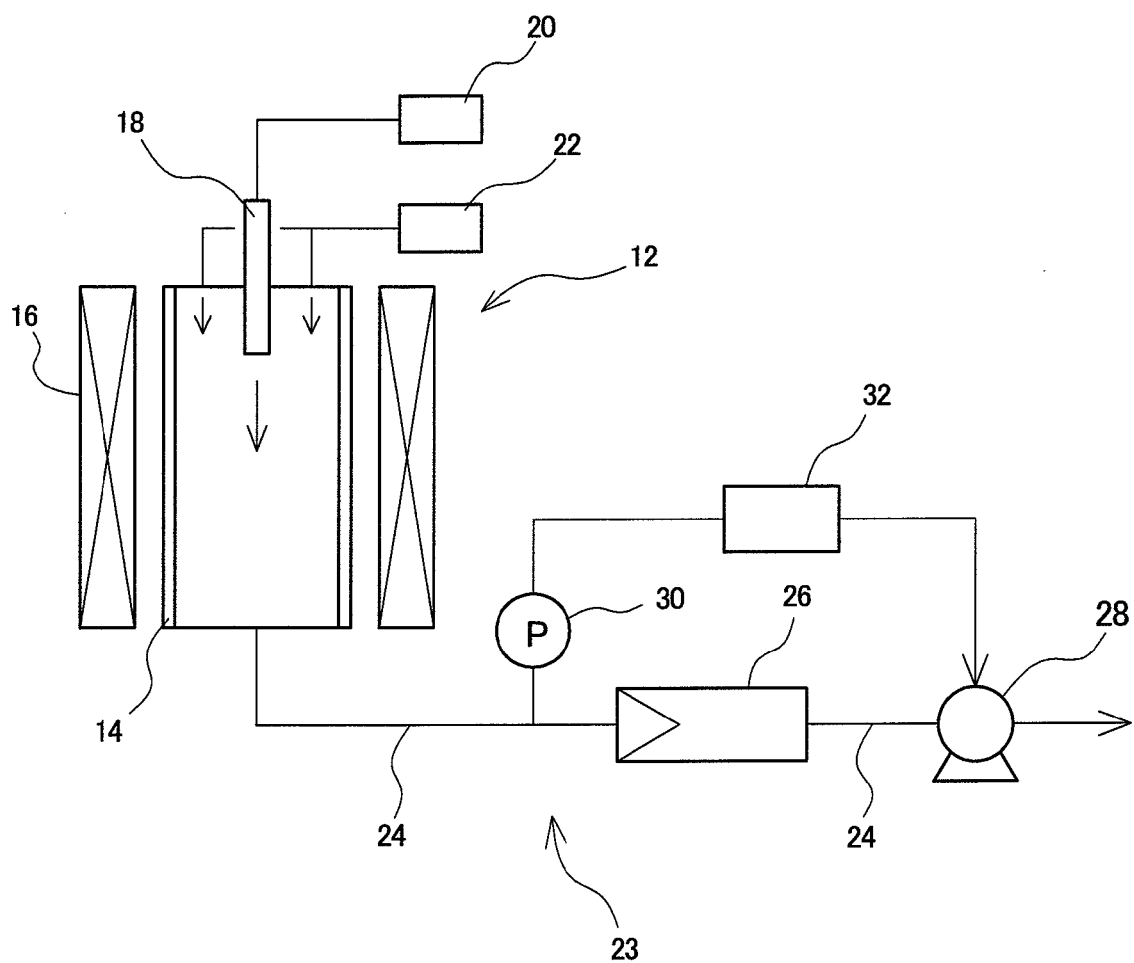

CARBON NANOTUBE OR CARBON NANOFIBER PRODUCTION APPARATUS AND RECOVERY APPARATUS

TECHNICAL FIELD

The present invention relates to a production apparatus for carbon microfibers, particularly nanotubes each with a diameter of 0.4 nanometers to several tens of nanometers, and in particular, to recovery of the synthesized carbon microfibers.

BACKGROUND ART

A production method for carbon nanotubes each with a diameter of 0.4 nanometers to several tens of nanometers is known, this method being based on a vapor phase growth method. In the present specification and the like, examples of carbon nanofibers include fishbone graphitic-structure nanotubes each of which is hollow, that is, tubular, but includes a graphitic layer that is not parallel to a fiber axis, ribbon-like graphitic fibers that are not hollow, and graphitic whiskers.

Carbon nanotubes or carbon nanofibers produced by the vapor phase growth method need to be recovered by being separated from gas. Japanese Patent Laid-Open No. 2006-169002 discloses a technique to catch carbon nanotubes or nanofibers carried by a carrier gas, on a filter such as a net or a plate with holes. When the carrier gas passes through the net or the like, the carbon nanotubes or nanofibers are caught on the net or the like.

When an obstacle such as a filter is provided in the carrier gas flow to catch the carbon nanotubes or nanofibers, an increase in the amount of carbon nanotubes or nanofibers increases the channel resistance to the carrier gas flow and thus the pressure on the upstream side of the filter. The elevated pressure may increase the pressure in a reactor in which the carbon nanotubes or nanofibers are synthesized, or disturb the gas flow in the reactor. This may affect the production process.

SUMMARY OF THE INVENTION

An object of the present invention is to suppress the adverse effect, on the production process for the carbon nanotubes or nanofibers, of the amount of carbon nanotubes or nanofibers caught on the filter.

In the present invention, a filter configured to catch carbon nanotubes or nanofibers is provided in a discharge pipe which is connected to a reactor configured to synthesize the carbon nanotubes or nanofibers and through which carrier gas containing the synthesized carbon nanotubes or nanofibers is discharged from the reactor. Suction means are provided in a portion of the discharge pipe located downstream of the filter to suck the discharged gas in the discharge pipe.

Moreover, a pressure sensor configured to detect the pressure in the discharge pipe may be provided in a portion of the discharge pipe located upstream of the filter. Control means may be provided for controlling the suction means so that the detected pressure is equal to a preset value.

Furthermore, a blower may carry out suction to cancel a pressure loss in the filter to maintain the pressure in the reactor constant.

The present invention can reduce the adverse effects of the amount of carbon nanotubes or nanofibers caught on the filter, on the environment in which the carbon nanotubes or nanofibers are synthesized.

BRIEF DESCRIPTION OF THE DRAWINGS

FIG. 1 is a schematic diagram of the configuration of a carbon nanotube production apparatus according to the present embodiment.

DETAILED DESCRIPTION OF EMBODIMENTS OF THE INVENTION

An embodiment of the present embodiment will be described below with reference to the drawing. FIG. 1 is a diagram schematically showing the configuration of a carbon nanotube production apparatus 10. A reactor unit 12 includes a reactor pipe 14 installed upright and to which a material is supplied, and a heater 16 located so as to surround the periphery of the reactor pipe 14. The reactor pipe 14 is made of ceramics and shaped like a pipe, preferably a circular pipe. The reactor pipe 14 is heated by the heater 16 and maintained at a preset temperature. The reactor pipe 14 includes a material supply nozzle 18 located at the top and through which a material supplied by the material supply apparatus 20 is injected into the reactor pipe 14. Carrier gas is fed from a carrier gas supply apparatus 22 to the top of the reactor pipe 14 so as to surround the injected material. The material gas contains a carbon source, a catalyst, and an auxiliary agent therefor. The material and carrier gas both fed into the reactor pipe 14 descend through the reactor pipe 14 while being heated by the pipe wall of the reactor pipe 14. During the descent, carbon nanotubes are grown and synthesized. This method is called a vapor phase growth method.

The generated carbon nanotubes are carried to a recovery apparatus 23 by carrier gas, unreacted material vapor, and reacted material vapor. The recovery apparatus 23 includes a filter 26 installed in the discharge pipe 24 connected to the bottom of the reactor pipe 14 and a blower 28 serving as suction means for sucking discharge gas in the discharge pipe. The filter 26 catches the carbon nanotubes present in the discharged gas. The filter 26 is preferably bent so as to have an increased surface area while offering minimized channel resistance. The blower 28 is installed in a portion of the discharge pipe 24 located further downstream of the filter 26. The blower 28 sucks the discharge gas from a portion of the discharge pipe 24 located upstream of the position where the blower is installed. The blower 28 allows the discharged gas passing through the filter to flow at a proper rate even if the filter 26 offers high channel resistance. Furthermore, this configuration enables operation to be continuously performed until the filter catches a large number of carbon nanotubes, compared to the configuration in which the suction based on the blower is not used.

A pressure sensor 30 configured to detect the pressure in the discharge pipe 24 may be provided in a portion of the discharge pipe 24 located upstream of the filter 26. A control section 32 configured to control the operational condition of the blower 28 performs the control based on the pressure in the discharge pipe detected by the pressure sensor. Preferably, the rotation speed of the blower 28 is controlled such that the detected pressure has a preset constant value. The value can be determined based on reaction conditions in the reactor pipe 14. To allow the rotation speed to be controlled, power can be supplied to the blower via an inverter. Controlling the pressure at the position of the pressure sensor 30 to the constant value may be considered to be the cancellation of a pressure loss in the filter 26 by the blower.

Since the pressure in the portion of the discharge pipe located upstream of the filter 26 is maintained constant, the reaction conditions such as the air current and pressure in the reactor pipe 14 are stabilized, thus improving reaction efficiency. This also prevents carbon nanotubes from being attached to the inner wall of the reactor pipe 14.

In the present embodiment, the carbon nanotube production apparatus based on the vapor phase growth method has been described. However, the above-described recovery apparatus can be applied to production apparatuses configured to synthesize carbon nanotubes or other carbon nanofibers by other gas phase flow reaction methods.

The invention claimed is:

1. A production apparatus for at least one of carbon nanotube and carbon nanofiber production comprising:
   a reactor to which a material and a carrier gas are supplied and which is configured to allow the material to react to synthesize at least one of a carbon nanotube and a carbon nanofiber by a gas phase flow reaction method;
   a discharge pipe through which the carrier gas and a product resulting from the reaction of the material and containing the at least one of a carbon nanotube and a carbon nanofiber are discharged from the reactor;
   a filter provided in the discharge pipe to catch the at least one of a carbon nanotube and a carbon nanofiber;
   suction means provided in a portion of the discharge pipe located downstream of the filter to suck the carrier gas in the discharge pipe;
   a pressure sensor provided in a portion of the discharge pipe located between the reactor and the filter to detect the pressure in said portion of the discharge pipe; and
   a control section configured to control the suction means so that a pressure sensed by the pressure sensor has a preset value.

2. The production apparatus according to claim 1, wherein the suction means is a blower.

3. A recovery apparatus for at least one of carbon nanotube and nanofiber recovery configured to recover at least one of a carbon nanotube and a carbon nanofiber synthesized in a reactor by a gas phase flow reaction method, the recovery apparatus comprising:
   a filter provided in a discharge pipe connected to the reactor and through which discharge gas containing the at least one of a carbon nanotube and a carbon nanofiber is discharged from the reactor, the filter catching the at least one of a carbon nanotube and a carbon nanofiber;
   suction means provided in a portion of the discharge pipe located downstream of the filter to suck the discharge gas in the discharge pipe;
   a pressure sensor provided in a portion of the discharge pipe located upstream of the filter to detect the pressure in said portion of the discharge pipe; and
   a control section configured to control the suction means so that a pressure sensed by the pressure sensor has a preset value.

4. The recovery apparatus according to claim 3, wherein the suction means is a blower.

* * * * *